(12) United States Patent
Neubauer et al.

(10) Patent No.: US 7,886,152 B2
(45) Date of Patent: Feb. 8, 2011

(54) METHOD AND DEVICE FOR EMBEDDING WATERMARK INFORMATION AND METHOD AND DEVICE FOR EXTRACTING EMBEDDED WATERMARK INFORMATION

(75) Inventors: Christian Neubauer, Nuremberg (DE); Juergen Herre, Buckenhof (DE); Ralph Kulessa, Feucht (DE); Frank Siebenhaar, Nuremberg (DE); Wolfgang Spinnler, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1340 days.

(21) Appl. No.: 10/502,622

(22) Filed: Jul. 22, 2004

(65) Prior Publication Data

US 2005/0105726 A1 May 19, 2005

Related U.S. Application Data

(63) Continuation of application No. PCT/EP03/01914, filed on Feb. 25, 2003.

(30) Foreign Application Priority Data

Apr. 12, 2002 (DE) .............................. 102 16 261

(51) Int. Cl.
*H04L 9/32* (2006.01)
(52) U.S. Cl. ...................................... 713/176; 380/237
(58) Field of Classification Search ................. 713/176; 382/100; 358/3.28; 283/113; 380/237
See application file for complete search history.

(56) References Cited

U.S. PATENT DOCUMENTS 6,952,486 B2 * 10/2005 Yamakage et al. .......... 382/100

(Continued)

FOREIGN PATENT DOCUMENTS

EP 1 087 377 3/2001

(Continued)

OTHER PUBLICATIONS

Bender, W., et al.; Techniques for Data Hiding; 1996; IBM Systems Journal, vol. 35, Nos. 3&4.

(Continued)

*Primary Examiner*—Eleni A Shiferaw
*Assistant Examiner*—Daniel L Hoang
(74) *Attorney, Agent, or Firm*—Glenn Patent Group; Michael A. Glenn

(57) ABSTRACT

For embedding watermark information into an information signal including audio and/or video information, first of all a synchronization sequence with a plurality of synchronization sequence units and a data sequence with a plurality of data sequence units are provided, wherein between the data sequence and the synchronization sequence a time shift is present and wherein a degree of shifting depends on the watermark information. A combination means generates a combination sequence having a plurality of combination sequence units from the synchronization sequence and the data sequence shifted with regard to the synchronization sequence, wherein the combination sequence units are derived from synchronization sequence units and shifted data sequence units. The combination sequence is combined with the information signal in order to embed the watermark information into the information signal. A watermark extractor receives a synchronization sequence correlation peak for every data sequence correlation peak associated with the same and therefore determines the watermark information on the basis of the time interval between the synchronization sequence correlation peak and the data sequence correlation peak in a secure and robust way. The concept is robust, provides a high data rate and is simultaneously flexible with regard to the weighting of synchronization energy and data energy and with regard to the robustness on the one hand and data rate on the other hand, respectively.

21 Claims, 3 Drawing Sheets

U.S. PATENT DOCUMENTS

2002/0164046 A1* 11/2002 Walker et al. ............... 382/100

FOREIGN PATENT DOCUMENTS

| JP | 2000-207828 | 7/2000 |
|---|---|---|
| JP | 2000-217088 | 8/2000 |
| JP | 2002044408 | 2/2002 |

OTHER PUBLICATIONS

Garcia, Ricardo; Digital Watermarking of Audio Signals Using a Psychoacoustic Auditory Model and Spread Spectrum Theory; 2002.

Mora-Jimenez, I.; A New Spread Spectrum Watermarking Method with Self-Synchronization Capabilities; 2000; IEEE.

Neubauer, C. and J. Herre; Advanced Watermarking and its Applications; Sep. 2000, AES.

Neubauer, C. and J. Herre; Audio watermarking of MPEG-2 AAC Bit Streams, Feb. 19, 2000.

Neubauer, et al.;.Continuous Steganographic data Transmission Using Uncompressed Audio; 1998.

Neubauer, C. and J. Herre; Digital Watermarking and its Influence on Audio Quality; Sep. 1998; AES.

Siebenhaar, F. et al.; Combined Compression/watermarking for Audio Signals; May 2001; AES.

Van der Veen, M. et al.; Robust, Multi-Functional and High Quality Audio Watermarking Technology; May 2001; AES.

* cited by examiner

METHOD AND DEVICE FOR EMBEDDING WATERMARK INFORMATION AND METHOD AND DEVICE FOR EXTRACTING EMBEDDED WATERMARK INFORMATION

CROSS-REFERENCE TO RELATED APPLICATIONS

This application is a continuation of co-pending International Application No. PCT/EP03/01914, filed Feb. 25, 2003, which designated the United States and was not published in English.

BACKGROUND OF THE INVENTION

1. Field of the Invention

The present invention relates to the field of watermark processing or "watermarking" and in particular to methods and devices for embedding watermark information or for extracting watermark information, respectively, in an information signal, including audio and/or video information.

2. Description of the Related Art

Watermarks for encoded or non-encoded audio signals and video signals are meanwhile known. Using watermarks additional data may be transmitted in a robust and inaudible or almost inaudible or invisible way, respectively, within an audio signal or video signal, respectively. Different embedding methods exist depending on the format (non-encoded or encoded), which may be implemented so that they work according to the same basic principle and are therefore compatible to each other. Here, a difference is made between PCM watermarks (PCM=pulse code modulation), bit stream watermark processing and a method in which the watermark embedding takes place in combination to the encoding. Different applications for watermarks may be found in the expert's publication "Advanced Watermarking and its Applications", C. Neubauer, J. Herre, 109. AES-Convention, Los Angeles, September 2000, preprint 5176.

In classic spread spectrum modulation which is used for conventional watermark embedding concepts, typically a BPSK (BPSK=binary phase shift keying) or QPSK (QPSK=quaternary phase shift keying) is used, i.e. a phase modulation. The QPSK is rarely used due to the necessity of a complex modulation in watermark methods. In typical spread spectrum concepts including BPSK modulation for each spread sequence with a number of L so called chips an information bit for every spread sequence or symbol, respectively, is transmitted. With regard to more details reference is made to the German Patent DE 196 40 814 C1.

In the following, a watermark extractor is described. At the output of a matched filter of the watermark extractor correlation peaks occur in the symbol pitch, whose signs, i.e. whose polarity carries the watermark information. Along the time axis within the correlator, when the signal/noise pitch is sufficiently high, correlation peaks result in regular intervals having different polarities, wherein a correlation peak with a negative polarity indicates a logic state "0" of the information bit, while correlation peaks with a positive polarity indicate a logic state "+1" of the information bits or vice versa.

The embedding of the watermark may be performed in different ways. In the example of audio signals the embedding of the watermark in uncompressed audio signals, i.e. time audio signals in the form of time-discrete consecutive samples is known. It is noted here, that the energy of watermark information is formed so that it lies below the acoustic masking threshold, so that the watermark information is not perceptible. In this context, reference is made to the expert's publication "Digital Watermarking and its Influence on Audio Quality", C. Neubauer, J. Herre, 105. AES-Convention, San Francisco 1998, preprint 4823. The proceedings are generally that first of all a spread sequence is provided and is left in its original form when the information bit has a logic state of "+1", or is inverted, respectively, when the information bit has a logic state of "0". This corresponds to a BPSK modulation. The spread sequence may then be transformed into the frequency domain and may be weighted using the psychoacoustic masking threshold, i.e. so that the spectral illustration of the spread sequence has an energy course across the frequency, which corresponds to the psychoacoustic masking threshold or lies below the same. The thus weighted watermark spectrum is then again transferred into a time illustration in order to obtain a psycho-acoustically weighted time illustration of the spread sequence. In a last step, the psycho-acoustically weighted time illustration of the spread sequence is added to the time-discrete audio signal in order to obtain an audio signal with inaudible embedded watermark information. Alternatively, the audio signal may be trans-formed into the frequency domain, and the junction of the psycho-acoustically weighted spread sequence and the audio signal present in the frequency domain may be performed in the frequency domain in order to obtain the audio signal with an embedded watermark already in the frequency domain which may then after an inverse transformation into the time domain be processed further.

Alternatively, technologies for embedding watermarks in already compressed audio signals exist, as it is disclosed in the expert's publication "Audio Watermarking of MPEG-2 AAC Bit Streams", C. Neubauer, J. Herre, 108. AES-Convention, Paris 2000, preprint 5101. The advantages of such a bit stream watermark method are on the one hand a low computational complexity, as no full decoding of the bit stream to be provided with a watermark is to be performed, wherein in particular the application of analysis and synthesis filter banks to the audio signal in the watermark embedder may be omitted. On the other hand, a high audio quality may be achieved, as the quantization noise and the watermark noise may be exactly tuned. The embedding in already compressed audio signals distinguishes itself also by a high robustness, as the watermark is not "weakened" by a subsequent audio encoder. Finally, a suitable selection of the spread band parameters enables a compatibility to the above-described PCM watermark methods.

If the audio signal is provided with a watermark already during the encoding of the same, also a low computational complexity results, as by the combination of watermark embedding and encoding certain operations, like e.g. the calculation of the masking model or the transformation of the audio signal into a spectral illustration needs to be performed only once. Also in this case a high audio quality may be guaranteed, as the quantization noise and the watermark noise may be exactly tuned. Also here a high robustness results, as the audio signal is not weakened by a subsequent encoder. Finally, also here a suitable selection of the spread band parameter allows a compatibility to the PCM watermark method. In this connection reference is made to the expert's publication "Combined Compression-Watermarking for Audio Signals", F. Siebenhaar, C. Neubauer, J. Herre 110. AES-Convention, Amsterdam, preprint 5344.

Disadvantageous about these different methods is the fact that they only allow a relatively low data rate which is, however, sufficient for example for simple author information, which, however, when for example the classic watermarking application for author information is abandoned, may quickly be too small. However, also in classic application cases the data rate is sometimes too low, in particular in cases, in which a very high robustness is to be achieved. Applications exist, however, in which both a high data rate and a high robustness are necessary simultaneously.

For increasing the data rate, it is proposed in the expert's publication "Robust, Multi-Functional and High-Quality Audio Watermarking Technology", M. van der Veen, et al., 110. AES-Convention, May $12^{th}$ to $15^{th}$ 2001, Amsterdam, Convention Paper 5345 not to use the classical PCM embedding strategy any more. For this, an audio signal is transformed using a discrete Fourier transformation into the frequency domain. For the watermark embedding a random sequence is used which is shifted depending on useful information which is also referred to as payload. The cyclically shifted version of this sequence is used to implement a multi bit payload with a special random sequence. Every possible shift may be associated with a payload. The random sequence shifted depending on the payload is weighted in the frequency domain and is then transformed into the time domain in order to obtain a time domain illustration of the shifted random sequence.

The watermark illustration present in the time domain is then also post-processed in the time domain in order to be finally added to the audio signal in order to obtain an audio signal having a watermark in the time domain. For a watermark detection a portion of the audio signal is segmented into frames and transformed into the frequency domain. Each frame is transformed into the frequency domain and subjected to a spectral shaping for a preprocessing before the extraction. These proceedings are performed with a plurality of segments, wherein the plurality of segments is accumulated in spectral values. The content of the accumulator is then subjected to a cross correlation with any possible shifted version of the random sequence, wherein with a certain shift a correlation peak results whose height is a measure for detection security and whose shift relative to a zero point of time includes payload information.

Problematic about the described method is the fact that the zero point of time based on which the shift is determined is generally not known a priory. If, for example, the watermark extraction is started sometime within the audio signal, it would be a pure coincidence if the segmenting raster was exactly met. In addition to that, watermarks need to be robust against attackers who perform manipulations at the audio signal having an embedded watermark to either change copying information to their advantage or to remove the watermark in an illegal way. If a watermark extractor is not able to determine the zero point of time based on the shift anymore, i.e., if the extractor looses synchronization, then it is not able anymore due to the inherent characteristics of the pulse phase modulation to extract watermark information faultlessly.

SUMMARY OF THE INVENTION

It is the object of the present invention to provide a robust watermarking concept which simultaneously allows for a high data rate.

In accordance with a first object, the present invention provides a device for embedding watermark information into an information signal including audio and/or video information, having a processor for providing a synchronization sequence with a plurality of synchronization sequence units and a data sequence with a plurality of data sequence units, wherein between the data sequence and the synchronization sequence a time shift larger than or equal to zero is present and wherein a degree of the shift depends on the watermark information; combiner for generating a combination sequence having a plurality of combination sequence units from the synchronization sequence and the data sequence shifted with regard to the synchronization sequence, wherein combination sequence units are derived from synchronization sequence units and shifted data sequence units; and a combiner combining the combination sequence and the information signal in order to embed the watermark information into the information signal.

In accordance with a second object, the present invention provides a method for embedding watermark information into an information signal including audio and/or video information, including the steps of providing a synchronization sequence with a plurality of synchronization sequence units and a data sequence with a plurality of data sequence units, wherein between the data sequence and the synchronization sequence a time shift larger than or equal to zero is present and wherein one degree of the shift depends on the watermark information; generating a combination sequence with a plurality of combination sequence units from the synchronization sequence and the data sequence shifted with regard to the synchronization sequence, wherein combination sequence units are derived from synchronization sequence units and shifted data sequence units; and combining the combination sequence and the information signal in order to embed the watermark information into the information signal.

In accordance with a third object, the present invention provides a device for extracting of watermark information embedded into an information signal comprising audio and/or video information, wherein the watermark information is embedded using a synchronization sequence and a data sequence and wherein a time shift larger than or equal to zero between the synchronization sequence and the data sequence indicates the embedded watermark information, having a processor for processing the information signal in which the watermark information is embedded, using the synchronization sequence, in order to obtain a synchronization correlation peak and using the data sequence in order to obtain a data sequence correlation peak, wherein the data sequence correlation peak occurs deviating from the synchronization sequence correlation peak by a time shift; and an interpreter for interpreting the time shift in order to recover the watermark information.

In accordance with a fourth object, the present invention provides a method for extracting of watermark information embedded into an information signal comprising audio and/or video information, wherein the watermark information is embedded using a synchronization sequence and a data sequence, and wherein a time shift larger than or equal to zero between the synchronization sequence and the data sequence indicates the embedded watermark information, including the steps of processing the information signal in which the watermark information is embedded, using the synchronization sequence in order to obtain a synchronization correlation peak and using the data sequence in order to obtain a data sequence correlation peak, wherein the data sequence correlation peak occurs deviating from the synchronization sequence correlation peak by a time shift; and interpreting the time shift in order to recover the watermark information.

The present invention is based on the findings that a robust watermark concept which simultaneously allows for a high data rate is obtained when watermark information is encoded according to the pulse phase modulation into the time interval of a data sequence correlation peak and a zero point of time, wherein, however, for each data sequence correlation peak also an additional synchronization frequency correlation peak indicating the "zero point of time" is caused, so that the decoder for a data sequence correlation peak also extracts an associated synchronization sequence correlation peak. The synchronization information in the form of the synchronization sequence correlation peak is therefore also continuously embedded into the information signal, such that a watermark extractor also provides the synchronization information, i.e. the zero point of time for each data sequence correlation peak, so that this zero point of time needs not be provided externally or by complicated declarations between a watermark embedder and a watermark extractor, respectively. In particular for the trials of an unallowed modification of the watermark such external declarations are a point of attack which is removed by the inventive concept. Thus, a robust watermark concept results which simultaneously enables the advantages of a high data rate which the pulse phase modulation brings along.

One advantage of the present invention is that the inventive watermark concept enables a multiplication of the data rate by a factor of N as compared to a BPSK modulation which depends on the maximum time shift to be generated between a data sequence and a synchronization frequency.

A further advantage of the present invention is that due to the high data rate forward error correction concepts (FEC concepts) known from digital message transmission may be used which enable an error correction in the receiver (extractor) by adding a redundancy in the transmitter (embedder).

A further advantage of the present invention is that a backward compatibility to the standard BPSK watermark embedding is given, as the synchronization correlation peak corresponds to the conventional BPSK correlation peaks and may also be modulated with regard to its polarity in order to carry information additionally.

It is a further advantage of the present invention that no change of the psychoacoustic parameters is required for weighting the pseudorandom sequence. In other words, the inventive concept has the advantage that it is independent of whether the combination of the weighted watermark signal and the information signal, i.e. the combination of watermark and information, takes place in the time domain or in the frequency domain.

The inventive concept further enables the possibility to increase the watermark data rate by adding further data signals. By combining a synchronization sequence not only with a data sequence but with several data sequences, in the watermark extractor a synchronization sequence correlation peak may be used not only to provide synchronization information for a data sequence correlation peak but for several data sequence correlation peaks.

In an alternative embodiment of the present invention, the synchronization sequence is identical to the data sequence, so that only one correlator is required in the watermark extractor.

In a further preferred embodiment of the present invention the synchronization sequence and the data sequence are different which provides the advantage that in the watermark extractor the differentiation between a synchronization sequence correlation peak and a data sequence correlation peak is easier as it is already known a priory from which correlator a data sequence correlation peak or a synchronization sequence correlation peak, respectively, is provided.

The time scanning for encoding information about the time shift between the two sequences or correlation peaks, respectively, is made larger than a chip in one preferred embodiment of the present invention, whereby a robustness against a time change of the audio signal is for example increased by a scanning rate conversion.

The correlation peaks may due to the synchronization sequence and/or the data sequence also additionally be BPSK modulated. By this a reverse compatibility to the classic BPSK modulation results and the data rate is further increased by two further data channels with a—although low—data rate of one bit per sequence.

If data words are to be transmitted, which comprise a greater number of bits than may be transmitted by one data sequence, a frame synchronization is necessary in so far as in the watermark extractor it may be determined which groups of synchronization sequence correlation peak and data sequence correlation peak belong together in order to result in such a long data word. In one preferred embodiment of the present invention it is preferred to modulate the synchronization sequences correspondingly, so that no individual "frame synchronization sequences" in the watermark data stream are required anymore, which directly leads to an increase of the net data rate in the watermark channel as the otherwise typical synchronization words are omitted.

In a further preferred embodiment of the present invention the ratio between the power of a data sequence correlation peak and a synchronization correlation peak is not selected equal to one, but is shifted into the direction of the synchronization sequence correlation peak or the data sequence correlation peak depending on the application, which may be achieved by weighting at least one of the two sequences with a factor unequal to one before the combination of the synchronization sequence with the data sequence. Thus, the possibility exists to adjust the energy ratio between synchronization energy and data energy to different robustness requirements or to set a prioritizing of the two layers (data layer and synchronization layer) with regard to robustness.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
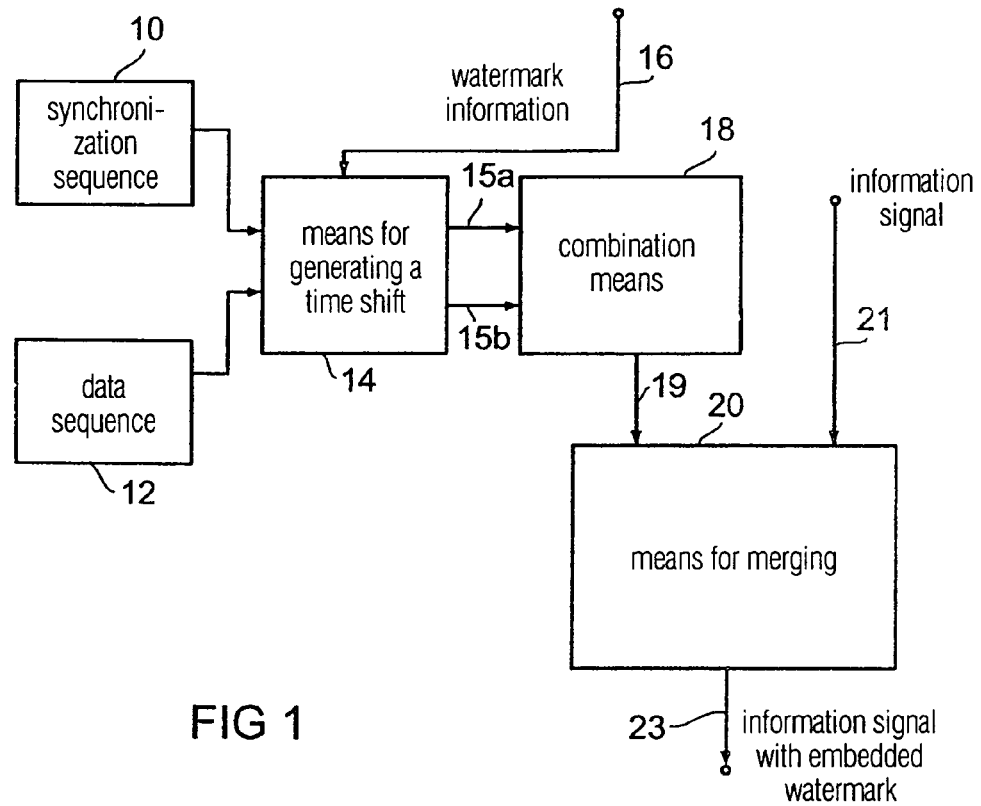
FIG. 1 shows a schematic block diagram of an inventive device for embedding watermark information into an information signal.

FIG. 1 shows a schematic block diagram of an inventive device for embedding watermark information into an information signal including audio and/or video information. In particular, means for providing a synchronization sequence 10 with a plurality of synchronization sequence units and a data sequence 12 with a plurality of data sequence units is provided, wherein the synchronization sequence and the data sequence are provided using means 14 for generating a time shift such that between the data sequence and the synchronization sequence a time shift larger or equal to zero is present, wherein one degree of this time shift depends on watermark information 16 to be embedded. It is in particular to be noted that also a time "shift" of zero may be used for encoding for example a zero.

A downstream combination means 18 is provided to obtain a combination sequence with a plurality of combination sequence units from the synchronization sequence and the data sequence shifted with regard to the synchronization sequence provided at the output of means 14 via output lines 15a and 15b, wherein combination sequence units are derived from synchronization sequence units and shifted data sequence units. Finally, means 20 for merging the combination sequence applied at an output line and the information signal provided via an input 21 is provided in order to provide the information signal with an embedded watermark at an output 23 which is to be processed by a watermark extractor shown in FIG. 2.

Figure 2:
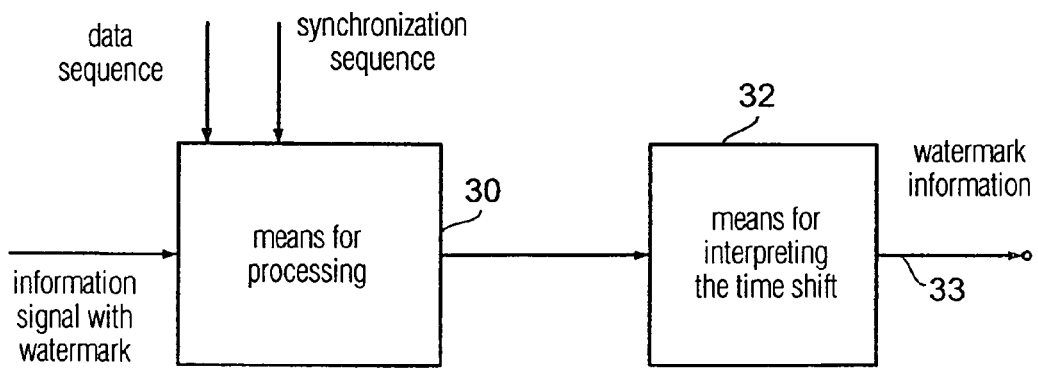
FIG. 2 shows a schematic block diagram of an inventive device for extracting watermark information from an information signal.

The watermark extractor shown in FIG. 2 includes means 30 for processing the information signal in which the watermark information is embedded, i.e. for example the information signal received at the output 23 of FIG. 1 using the synchronization sequence 10 of FIG. 1 and using the data sequence 12 of FIG. 1. Means 30 for processing provides a synchronization sequence correlation peak and a data sequence correlation peak at the output side, wherein the data sequence correlation peak is shifted by a time shift with regard to the synchronization sequence correlation peak. Means 32 for interpreting this time shift is provided to recover the watermark information at an output 33 of the watermark extractor.

Figure 3:
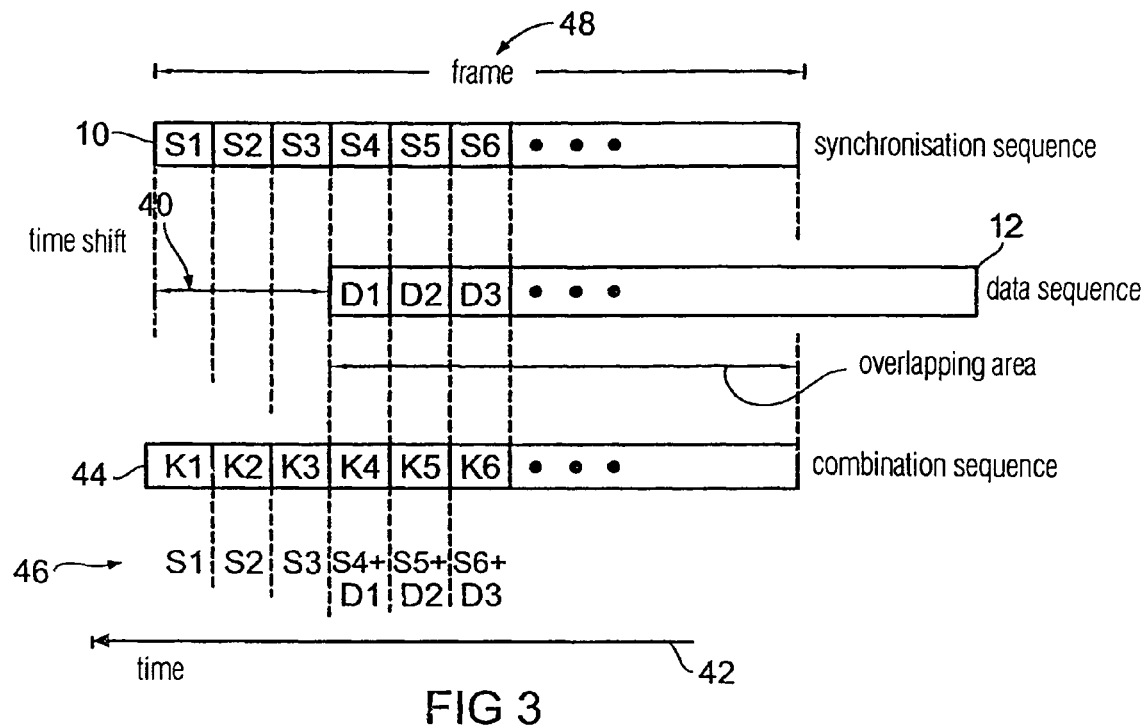
FIG. 3 shows an illustration for explaining the functioning of the means for generating a time shift and the combination means of FIG. 1.

In the following, with reference to FIG. 3 the functioning of the watermark extractor shown in FIG. 1 is explained in more detail. In FIG. 3, a synchronization sequence 10 with synchronization sequence units S1, S2, S3, S4, S5, S6 . . . is shown. Additionally, a data sequence 12 with data sequence units D1, D2, D3, . . . is illustrated. Means 14 for generating a time shift of FIG. 1 was already effective to generate a time shift 40 between the synchronization sequence 10 and the data sequence 12 which amounts to three so called chips, that is units of the two sequences, in the example shown in FIG. 3. From a time axis 42 of FIG. 3 it may be seen that the data sequence 12 was delayed by three chips with regard to the synchronization sequence 10, i.e. by the time shift 40. Alternatively, however, also the synchronization sequence could have been delayed with regard to the data sequence as long as it is guaranteed in the watermark extractor that the allocation between a synchronization sequence and one (or several) data sequences is settled.

In FIG. 3, further a combination sequence with combination sequence units K1, K2, K3, K4, K5, K6, . . . is shown. The combination sequence units in the preferred embodiment of the present invention result from adding time-corresponding units of the synchronization sequence 10 and the data sequence 12. After a time shift by three chips in the example shown in FIG. 3 is selected, the first three combination sequence units K1, K2, K3 are identical to the first three synchronization sequence units, as it may be seen from a line 46 below the combination sequence 44 in FIG. 3. The combination sequence unit K4 now, however, for example corresponds to the addition of the synchronization sequence unit S4 and the data sequence unit D1. Analog to this the combination sequence unit K5 is determined, which again corresponds to the addition of the synchronization sequence unit S5 and the data sequence unit D2. Similar proceedings are taken for the calculation of the combination sequence unit K6.

In principle, the length of the combination sequence in contrast to the example shown in FIG. 3 may deviate from the length of the synchronization sequence if at the end of the combination sequence 44 shown in FIG. 3 the last (in this example three) data sequence units would be added. According to the invention it is preferred, however, to select a fixed frame length, wherein this frame length is equal to the length of the synchronization sequence 10 in chips, such that a frame 48 is defined by the synchronization sequence 10 for this frame independent of the encoded data.

As three chips of the data sequence 12 are not embedded into the information signal but are "discarded" as it may be seen from FIG. 3, the energy of the data sequence in the information signal is decreased correspondingly. From this, in the preferred embodiment of the present invention shown in FIG. 3, the maximum time shift 40 to be applied for encoding payload information (watermark information) results. The maximum interval M of an offset of two sequences thereby determines the number of simultaneously transmitted bits per watermark information symbol and results from the formation of the dual logarithm of the maximum interval of two peaks within chips. If for example a word width of 8 bits is selected, a maximum time shift 40 needs to be 256 chips.

As an implementation example a length of the synchronization sequence and the data sequence of 4 kchips is used. Due to the cutting off of the "projecting" data sequence units, as it was implemented, a degradation of the signal/noise ratio occurs when the data sequence is regarded as a signal and the audio signal into which the data sequence is to be inserted is regarded as noise. A degradation of this signal/noise ratio by 3 dB due to the cutting off of projecting data sequence units would allow a maximum shift by half of the sequence length, i.e. 2 kchips. With this degradation by 3 dB ld (2 kchips)=11 bits could be encoded. If only eight bits per frame 48 are to be encoded, thus a substantially smaller maximum shift of only 256 chips results, which again causes that the S/N degradation due to the cutting off of the projecting chips is substantially smaller than 3 dB.

As it was illustrated in FIG. 3, the combination means 18 of FIG. 1 in this example only operates so that the corresponding chips occurring simultaneously in time are simply added. In one alternative embodiment of the present invention, this combination does not have to be in a ratio of 1:1. Instead, before the combination, for example by an addition, the synchronization sequence unit and/or the data sequence unit to be combined is pulsed with a factor unequal 1, so that in the combination sequence either the data sequence or the synchronization sequence with regard to the other "partner" is preferred. This way it is possible to compensate for the energy loss by cutting off the projecting data sequence units in so far that the still present data sequence units are enlarged compared to the synchronization sequence units, i.e. multiplied by a factor larger than 1, before the combination means then combines the two sequences chip by chip.

Alternatively, for applications in which a particularly high robustness is required, i.e. a particularly high reliability of the synchronization information, a preference of the synchronization sequence units may be performed so that the energy that is typically available for the watermark is distributed more in favor of the synchronization sequence in order to guarantee clear synchronization peaks in the watermark extractor in any case, while regarding the clarity of data sequence correlation peaks in certain conditions certain compromises have to be accepted. In other words this means that the data and synchronization peaks are "sent" with different energies, wherein the energy ratio between the "synchronization energy" and the "data energy" may be flexibly adjusted to robustness requirements. Thus, also a prioritizing of the layers (data layer and synchronization layer) with regard to robustness may be set.

Figure 5:
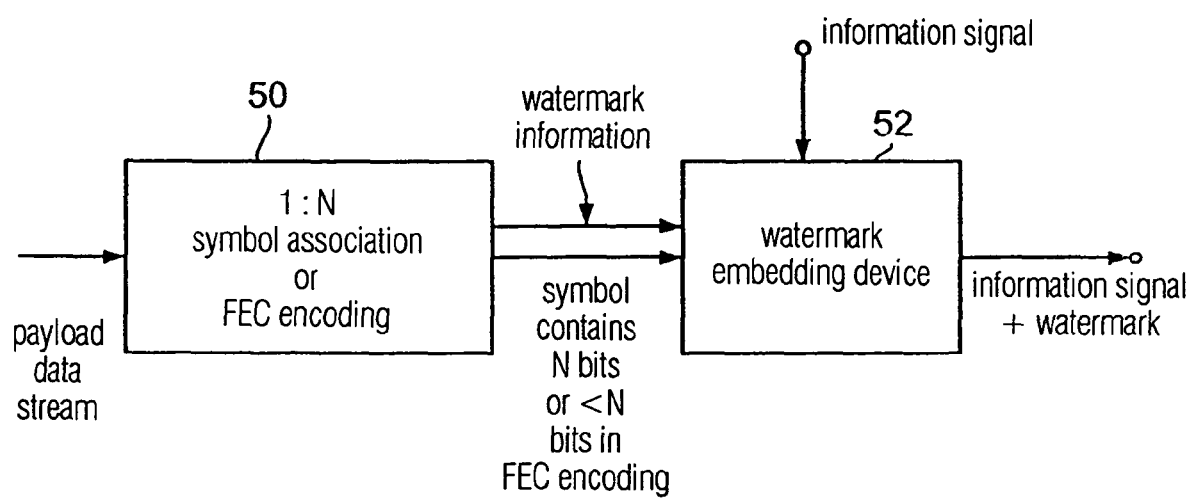
FIG. 5 shows a block illustration for explaining different possibilities for rendering a payload bit stream in order to obtain the watermark information to be embedded into the information signal.

The increase of the data rate by the factor N may also be used not to completely use the data rate increase for payload data, but for example to increase the payload data rate by only N/2 and to perform the other N/2 bits for a redundancy encoding with regard to a forward error correction. These two alternatives are illustrated in FIG. 5. In one payload data processing means 50 a payload data bit stream is fed. In the first case, means 50 performs a serial/parallel conversion of the payload data bit stream into a watermark information symbol. For the 8 bit example which was described above this would mean that eight consecutive payload data bits are serial/parallel converted in order to result in a binary number whose value corresponds to a time shift 40 of FIG. 3. This specific value of the time shift then illustrates the watermark information which is achieved using the watermark embedding device of FIG. 1 designated by 52 in FIG. 5 in order to provide an information signal including embedded watermark using the information signal.

If, however, in means 50 a redundancy encoding is performed in order to achieve a forward error correction, for example only four consecutive bits of the payload data bit stream are combined and encoded with a redundancy code of the code rate ½ in order to obtain a redundant watermark information symbol which also comprises eight bits and represents a number which a certain time shift 40 of FIG. 3 is associated with. In this case, in a watermark extractor a decoding method corresponding to this redundancy code may be used, like e.g. a Viterbi method known in telecommunications or another method based on probabilities.

Figure 4:
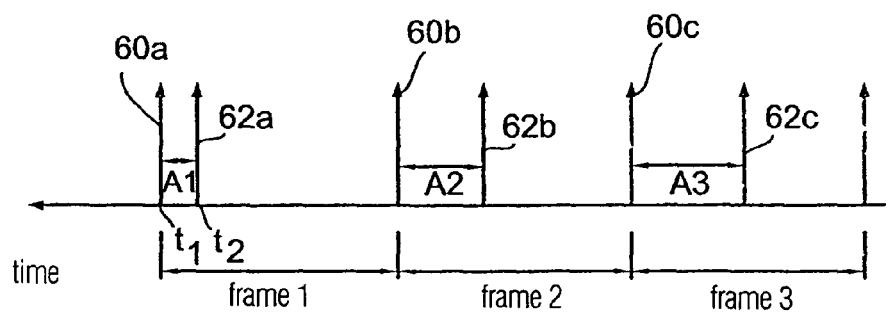
FIG. 4 shows a time illustration of correlation peaks at the watermark extractor for explaining the functioning of the watermark extractor of FIG. 2.

In the following, with reference to FIG. 4, reference is made to the functioning of the inventive watermark extractor. FIG. 4 shows a sequence of three frames time plotted, wherein with each frame in the example shown in FIG. 4 a synchronization correlation peak 60a, 60b, 60c is associated and wherein each frame additionally includes a data sequence correlation peak 62a, 62b or 62c, respectively.

The processing means 30 of the watermark extractor will output the synchronization correlation peak 60a at a certain point of time t1 and the data sequence correlation peak 62a at a certain point of time t2 which is later in time than the point of time t1. The transmitted payload data information lies in the time difference A1 between the point of time t2 and t1. The synchronization information of the synchronization correlation peak 60a is therefore provided for each frame in the inventive concept, so that no external synchronization declarations or similar things exists which represent points of attack and which would additionally severely affect the flexibility of the whole watermark concept.

The watermark extractor will determine for frame 2 that the transmitted payload information is a different one, as the time interval A2 between the synchronization correlation peak 60b and the data sequence correlation peak 62b is different to the one in frame 1. The same applies to frame 3.

Depending on the implementation, the synchronization sequence 10 of FIG. 1 may be identical to the data sequence 12 of FIG. 1 or may preferably be orthogonal to the same. In case of identical sequences a watermark extractor which for example starts at an unknown point of time with the watermark extraction, does not know which correlation peak is a synchronization sequence correlation peak or a data sequence correlation peak. In order to determine this, the watermark extractor according to the invention proceeds such that it decorrelates several frames, like e.g. the three frames shown in FIG. 4, in order to obtain the illustrated pattern of the correlation peaks shown in FIG. 4. Then the watermark extractor determines whether a fixed scan distance, i.e. the frame length, exists between correlation peaks spaced apart in time. This way, the correlator will determine that between the 60a, 60b and 60c a respectively equal distance is present, wherein this generally not applies to the data sequence correlation peaks, as it is not probable that the same data information is transmitted in several frames.

In an alternative embodiment, the synchronization sequence correlation peaks may be modulated with regard to the polarity according to the conventional BPSK modulation. This may be used for the fact that according to the convention any synchronization correlation peaks have a negative polarity, while any data sequence correlation peaks have a positive polarity. In this case, a watermark extractor needs not perform the above-described raster recognition algorithm, but may indicate only due to the polarity of one single peak whether this is a synchronization sequence correlation peak or a data sequence correlation peak.

In the case of synchronization and data sequences which are orthogonal to each other, no such differentiation needs to be performed, as it is known from the beginning which correlator provides a synchronization correlation peak or a data correlation peak.

The polarity both of the synchronization sequence correlation peaks 60a-60c and of the data sequence correlation peaks 62a-62c may further be used in order to include two further information channels whose information is transmitted by the fact that one peak is either positive or negative.

If information words in the payload data stream of FIG. 5 exist which are longer than for example eight bits, then these words, when they are for example 24 bits long, may easily be separated into three consecutive watermark information symbols comprising eight bits each and may for example be transmitted one after the other in the three frames shown in FIG. 4. In this case, the watermark correlator is confronted with the task to recognize which three consecutive frames belong together and together form the 24 bit data word. This information, i.e. the "payload data synchronization", may also easily be achieved using the polarity for example of the synchronization sequence correlation peak. According to the convention, for example the first synchronization sequence correlation peak of a sequence of three frames which together form a payload data information word may have a polarity deviating from the two other frames. For this case also more lavish and secure synchronization sequence peak modulation concepts may be used which do not only include the frames belonging to an information word but which extend across several consecutive information words.

Due to the fact, that the chips of a combination sequence in means 20 are added to e.g. time-discrete samples of the information signal for combing, a sampling rate conversion (resampling) by an attacker may cause that a correlator does not exactly recognize time intervals between a synchronization peak and a data peak anymore but that these time intervals altogether become smaller or larger depending on whether the sampling rate of the audio portion is selected higher or lower than originally provided. In order to achieve a higher robustness against such attacks it is preferred to select the encoding raster, i.e. the association of a time shift with a watermark information symbol, not in a raster of smallest possible raster intervals, i.e. a sequence unit or a chip, but to take a larger encoding raster, which for example includes two, three or more chips. Of course, as a result the data rate is decreased by half, when for example a 2 chip raster is used, or the data rate may even be divided by three, when a 3 chip raster is used. Due to the high data rate gain by the inventive pulse phase modulation with an additional synchronization peak transmission such data rate losses may be often accepted, however, for the purpose of a better robustness. At this point it is obvious that the inventive concept is very flexible in so far that robustness on the one hand and data rate on the other hand may be matched to each other and may be optimally adjusted for every special application individually.

Depending on the conditions, the inventive watermark embedding method or the inventive watermark extraction method may be implemented in hardware or in software. The implementation may performed be on a digital storage medium, in particular on a floppy disc or a CD with electronically readable control signals, which may work together with a programmable computer system so that the corresponding method is performed. In general, the invention therefore also consists in a computer program product having a program code stored on a machine-readable carrier for performing the inventive methods when the computer program product runs on a computer. In other words, the invention may therefore also be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for embedding watermark information into an information signal including audio and/or video information, comprising:
    processor for providing a synchronization sequence with a plurality of synchronization sequence units and a data sequence with a plurality of data sequence units, the data sequence being different from the watermark information, wherein between the data sequence and the synchronization sequence a time shift larger than or equal to zero is present and wherein a degree of the shift depends on the watermark information,
    wherein the processor is implemented to provide a data sequence which is different from the synchronization sequence;
    a first combiner for generating a combination sequence having a plurality of combination sequence units from the synchronization sequence and the data sequence shifted with regard to the synchronization sequence, wherein combination sequence units are derived from synchronization sequence units and shifted data sequence units; and
    a second combiner for combining the combination sequence and the information signal in order to embed the watermark information into the information signal.

2. The device according to claim 1,
    wherein the data sequence is orthogonal to the synchronization sequence.

3. The device according to claim 1,
    wherein the synchronization sequence and the data sequence are pseudo random sequences.

4. The device according to claim 1,
    wherein the processor is implemented in order to provide the synchronization sequence and the data sequence with an identical length.

5. The device according to claim 1,
    wherein the first combiner is implemented to add synchronization sequence units and data sequence units within an overlapping area in time.

6. The device according to claim 1,
    wherein the first combiner is implemented to enlarge or reduce data sequence units before a combination with overlapping synchronization sequence units compared to the synchronization sequence units.

7. The device according to claim 1,
    wherein the first combiner is implemented in order to generate the combination sequence having a length which is equal to the length of the synchronization sequence, wherein data sequence units which are not overlapping in time with the synchronization sequence units are not part of the combination sequence.

8. The device according to claim 1,
    wherein the processor is implemented in order to set the shift at maximum to half a length of the synchronization sequence.

9. The device according to claim 1,
    further comprising a redundancy encoder in order to encode payload data for a forward error correction in order to obtain the watermark information having a higher information redundancy compared to the payload data.

10. The device according to claim 1,
    wherein the processor is implemented in order to perform a time shift between the data sequence and the synchronization sequence in a time raster whose raster distance amounts to a manifold of a synchronization sequence unit.

11. The device according to claim 1,
    wherein the synchronization sequence and/or the data sequence is/are encoded depending on a further data channel with regard to a polarity of the same.

12. The device according to claim 1,
    wherein the second combiner is implemented in order to weight a combination sequence so that its energy lies generally below a psychoacoustic or a psychooptic masking threshold.

13. The device according to claim 1,
    wherein the watermark information is binary and comprises an information word including more bits than are to be encoded by the time shift between the data sequence and the synchronization sequence,
    wherein a plurality of consecutive synchronization sequences and associated data sequences are applicable to process the whole information word, and
    wherein further a synchronization sequence modulation device is present in order to modulate the consecutive synchronization sequences so that it may be determined within a watermark extractor which synchronization sequences and associated data sequences together illustrate the information word.

14. A method for embedding watermark information into an information signal including audio and/or video information, comprising:
    providing a synchronization sequence with a plurality of synchronization sequence units and a data sequence with a plurality of data sequence units, the data sequence being different from the watermark information, wherein between the data sequence and the synchronization sequence a time shift larger than or equal to zero is present and wherein one degree of the shift depends on the watermark information, wherein the data sequence is different from the synchronization sequence;

generating a combination sequence with a plurality of combination sequence units from the synchronization sequence and the data sequence shifted with regard to the synchronization sequence, wherein combination sequence units are derived from synchronization sequence units and shifted data sequence units; and combining the combination sequence and the information signal in order to embed the watermark information into the information signal, wherein the method is performed by a hardware device.

15. A device for extracting of watermark information embedded into an information signal comprising audio and/or video information, comprising:

a processor for processing the information signal in which the watermark information is embedded wherein the watermark information is embedded using a synchronization sequence and a date sequence, and wherein a time shift larger than or equal to zero between the synchronization sequence and the data sequence indicates the embedded watermark information, wherein the processor is configured for using the synchronization sequence, in order to obtain a synchronization correlation peak and using the data sequence in order to obtain a data sequence correlation peak, the data sequence being different from the watermark information, wherein the data sequence correlation peak occurs deviating from the synchronization sequence correlation peak by a time shift, and wherein the synchronization sequence is different from the data sequence; and an interpreter for interpreting the time shift in order to recover the watermark information.

16. The device according to claim 15, wherein further in polarities of the synchronization sequence correlation peaks and/or in polarities of the data sequence correlation peaks further information is encoded, wherein the interpreter for interpreting is further implemented in order to evaluate a polarity of the synchronization sequence correlation peaks and/or a polarity of the data sequence correlation peaks.

17. The device according to claim 15, wherein watermark information is binary and comprises an information word including more bits than are to be encoded by the time shift between the data sequence and the synchronization sequence, wherein a plurality of consecutive synchronization sequences and associated data sequences may be used to embed the whole information word, and wherein the consecutive synchronization sequences were modulated so that it may be determined which synchronization sequences and associated data sequences together represent the information word, wherein the interpreter is implemented in order to perform a synchronization sequence demodulation in order to determine which synchronization sequence correlation peaks and associated data sequence correlation peaks together represent the information word.

18. The device according to claim 15, wherein the watermark information was further redundancy encoded from payload data information, and wherein the interpreter is implemented in order to perform a decoding on the basis of the added redundancy.

19. A method for extracting of watermark information embedded into an information signal comprising audio and/or video information, comprising:

processing the information signal in which the watermark information is embedded, wherein the watermark information is embedded using a synchronization sequence and a data sequence, and wherein a time shift larger than or equal to zero between the synchronization sequence and the data sequence indicates the embedded watermark information, wherein the processing the information signal comprising using the synchronization sequence in order to obtain a synchronization correlation peak and using the data sequence in order to obtain a data sequence correlation peak, the data sequence being different from the watermark information, wherein the data sequence correlation peak occurs deviating from the synchronization sequence correlation peak by a time shift wherein the synchronization sequence is different from the data sequence; and interpreting the time shift in order to recover the watermark information, wherein the method is performed by a hardware device.

20. A digital storage medium having stored thereon a computer program having a program code for performing a method for embedding watermark information into an information signal including audio and/or video information, when the computer program runs on a computer, the method comprising:

providing a synchronization sequence with a plurality of synchronization sequence units and a data sequence with a plurality of data sequence units, the data sequence being different from the watermark information, wherein between the data sequence and the synchronization sequence a time shift larger than or equal to zero is present and wherein one degree of the shift depends on the watermark information;

generating a combination sequence with a plurality of combination sequence units from the synchronization sequence and the data sequence shifted with regard to the synchronization sequence, wherein combination sequence units are derived from synchronization sequence units and shifted data sequence units wherein the synchronization sequence is different from the data sequence; and combining the combination sequence and the information signal in order to embed the watermark information into the information signal.

21. A digital storage medium having stored thereon a computer program having a program code for performing a method for extracting watermark information embedded into an information signal comprising audio and/or video information, when the computer program runs on a computer, the method comprising:

processing the information signal in which the watermark information is embedded, wherein the watermark information is embedded using a synchronization sequence and a data sequence, and wherein a time shift larger than or equal to zero between the synchronization sequence and the data sequence indicates the embedded watermark information, wherein the processing the information signal comprises using the synchronization sequence in order to obtain a synchronization correlation peak and using the data sequence in order to obtain a data sequence correlation peak, the data sequence being different from the watermark information, wherein the data sequence correlation peak occurs deviating from the synchronization sequence correlation peak by a time shift, and wherein the synchronization sequence is different from the data sequence; and interpreting the time shift in order to recover the watermark information.

* * * * *